(12) United States Patent
Kim

(10) Patent No.: US 9,703,328 B2
(45) Date of Patent: Jul. 11, 2017

(54) HINGE ASSEMBLIES FOR COMPUTING DEVICES

(71) Applicant: HEWLETT-PACKARD DEVELOPMENT COMPANY, L.P., Houston, TX (US)

(72) Inventor: Kwang Ho Kim, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/892,025

(22) PCT Filed: Jul. 8, 2013

(86) PCT No.: PCT/US2013/049568
§ 371 (c)(1),
(2) Date: Nov. 18, 2015

(87) PCT Pub. No.: WO2015/005898
PCT Pub. Date: Jan. 15, 2015

(65) Prior Publication Data
US 2016/0109909 A1 Apr. 21, 2016

(51) Int. Cl.
*G06F 1/16* (2006.01)
(52) U.S. Cl.
CPC .......... *G06F 1/1681* (2013.01); *G06F 1/1616* (2013.01)
(58) Field of Classification Search
CPC ...... G06F 1/1681; G06F 1/1616; G06F 1/162; G06F 1/203; G06F 1/1637; G06F 1/1679;
(Continued)

(56) References Cited

U.S. PATENT DOCUMENTS 2,581,318 A * 1/1952 Bartlett ............ A01K 3/00
119/514
6,588,062 B2 7/2003 Novin et al.
(Continued)

FOREIGN PATENT DOCUMENTS

| JP | 06-159347 A | 6/1994 |
| JP | 2004-052373 A | 2/2004 |
| KR | 20-1999-0019923 U | 6/1999 |

OTHER PUBLICATIONS

Korean Intellectual Property Office, International Search Report and Written Opinion for PCT/US2013/049568 dated Apr. 11, 2014 (11 pages).

*Primary Examiner* — Anthony Haughton
*Assistant Examiner* — Ingrid Wright
(74) *Attorney, Agent, or Firm* — HP Patent Department

(57) ABSTRACT

A hinge assembly of a computing device may be provided, for example. The hinge assembly may include a first hinge member and a second hinge member. The first hinge member may include a first mounting plate attached to a first gudgeon member via a first tongue portion. The second hinge member may include a second mounting plate attached to a second gudgeon member via a second tongue portion. The first and second mounting plates may be shaped so that they can be stacked in parallel along an axis such that the first and second gudgeons may be aligned perpendicular to the axis to allow a pintle member to be inserted through the first and second gudgeons and such that the first and second tongue portions may be spaced apart along the axis.

20 Claims, 10 Drawing Sheets

(58) Field of Classification Search
CPC .... G06F 1/1656; G06F 1/1632; G06F 1/1635; H05K 5/0226
USPC ............ 361/679.01, 679.02, 679.09, 679.26, 361/679.27; 248/917–924
See application file for complete search history.

(56) References Cited

U.S. PATENT DOCUMENTS

| | | |
|---|---|---|
| 6,671,929 B1 | 1/2004 | Lu |
| 6,748,625 B2 | 6/2004 | Lu |
| 6,754,081 B2 | 6/2004 | Rude et al. |
| 6,807,711 B2 | 10/2004 | Lu |
| 2003/0126719 A1 | 7/2003 | Chen |
| 2008/0184530 A1 | 8/2008 | Chao |
| 2008/0271289 A1* | 11/2008 | Hsu ..................... G06F 1/1681 16/234 |
| 2010/0139042 A1 | 6/2010 | Chang |

* cited by examiner

HINGE ASSEMBLIES FOR COMPUTING DEVICES

BACKGROUND

A computing device such as a laptop may include a display assembly and a base section that are rotatably attached by a hinge. The hinge may allow a limited angle of rotation between the members about a pivotal axis of rotation. Using the hinge, a user may transition the display assembly between a closed position, in which the display assembly may be in parallel with the base section such that the display assembly is facing inward and adjacent toward a keyboard of the base section, and an open position; in which the display assembly is oriented at, for example, an obtuse angle relative to the base section to allow the user to view the display assembly.

BRIEF DESCRIPTION OF THE DRAWINGS

Some examples are described with respect to the following figures.

DETAILED DESCRIPTION

Before particular examples of the present disclosure are disclosed and described, it is to be understood that this disclosure is not limited to the particular examples disclosed herein as such may vary to some degree. It is also to be understood that the terminology used herein is used for the purpose of describing particular examples only and is not intended to be limiting, as the scope of the present disclosure will be defined only by the appended claims and equivalents thereof.

Notwithstanding the foregoing, the following terminology is understood the mean the following when recited by the specification or the claims. The singular forms 'a,' 'an,' are intended to mean 'one or more,' For example, 'a part' includes reference to one or more of such a 'part.' Additionally, the term 'attached' is intended to include both direct forms of attachment and indirect forms of attachment such as where one or more intervening elements may be included between the parts being attached. Further, the terms 'including' and 'having' are intended to have the same meaning as the term 'comprising' has in patent law.

The present disclosure concerns a friction hinge for a computing device that may provide reduced oscillation, secure fastening of the hinge assembly to the base section, and high structural stability and stiffness, (1) without negatively impacting the friction hinge's operating characteristics, such as hinge operating force requirements or rotational movement of the friction hinge, and (2) without increasing the size of the overall friction hinge, thereby allowing the friction hinge to fit in the limited space provided by a computing device. The elements of the friction hinge responsible for operating characteristics and for structural stability aspects may be decoupled, thereby allowing optimization of operating characteristics and structural stability aspects independently.

The hinge assembly is made up of separate hinge members that may incorporate structural stiffening features and damping features. These features may include appropriate dimensioning, for example stacking mounting plates of the hinge members, such that tongue portions connecting the mounting plates to gudgeon members may be vertically spaced apart relative to each other, and such that the tongue portions may be widened.

The dimensions of the friction hinge may thus be selected to have a high natural frequency and a decreased settling time. These features may provide high structural stability and stiffness, a boost in the rigidity of the friction hinge, and less deflection and faster stabilization of the display assembly under external disturbance, creating a better user experience.

Figure 1:
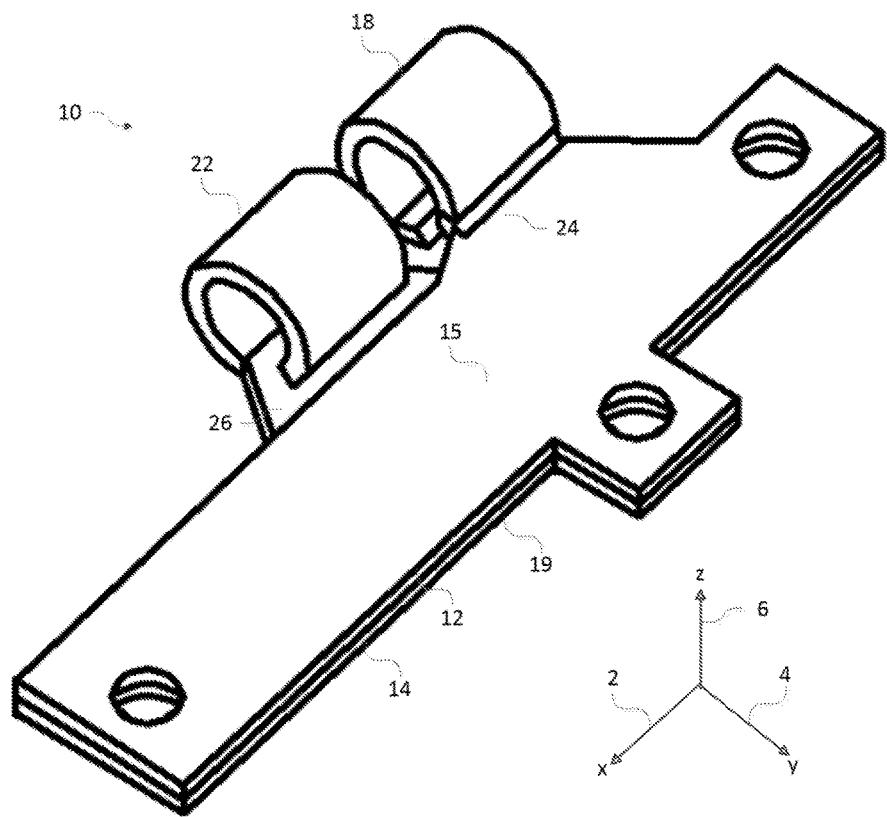
FIG. 1 illustrates a perspective view of a hinge assembly according to some examples.

FIG. 1 illustrates a perspective view of a hinge assembly 10 according to some examples. To aid in illustration of the hinge assembly 10, a set of perpendicular axes are shown, namely an x-axis 2, y-axis 4, and z-axis 6.

The hinge assembly 10 may include hinge members 12 and 14. The hinge member 12 may include mounting plate 15 attached to a gudgeon member 18 via a tongue portion 24. The hinge member 14 may include mounting plate 19 attached to a gudgeon member 22 via a tongue portion 26. The first and second mounting plates 15 and 19 may be shaped so that they can be stacked in parallel along the z-axis 6 such that the first and second gudgeons 18 and 22 may be aligned to allow a pintle member to be inserted the therethrough and such that the first and second tongue portions 24 and 26 may be spaced apart along the z-axis 6.

Figure 2:
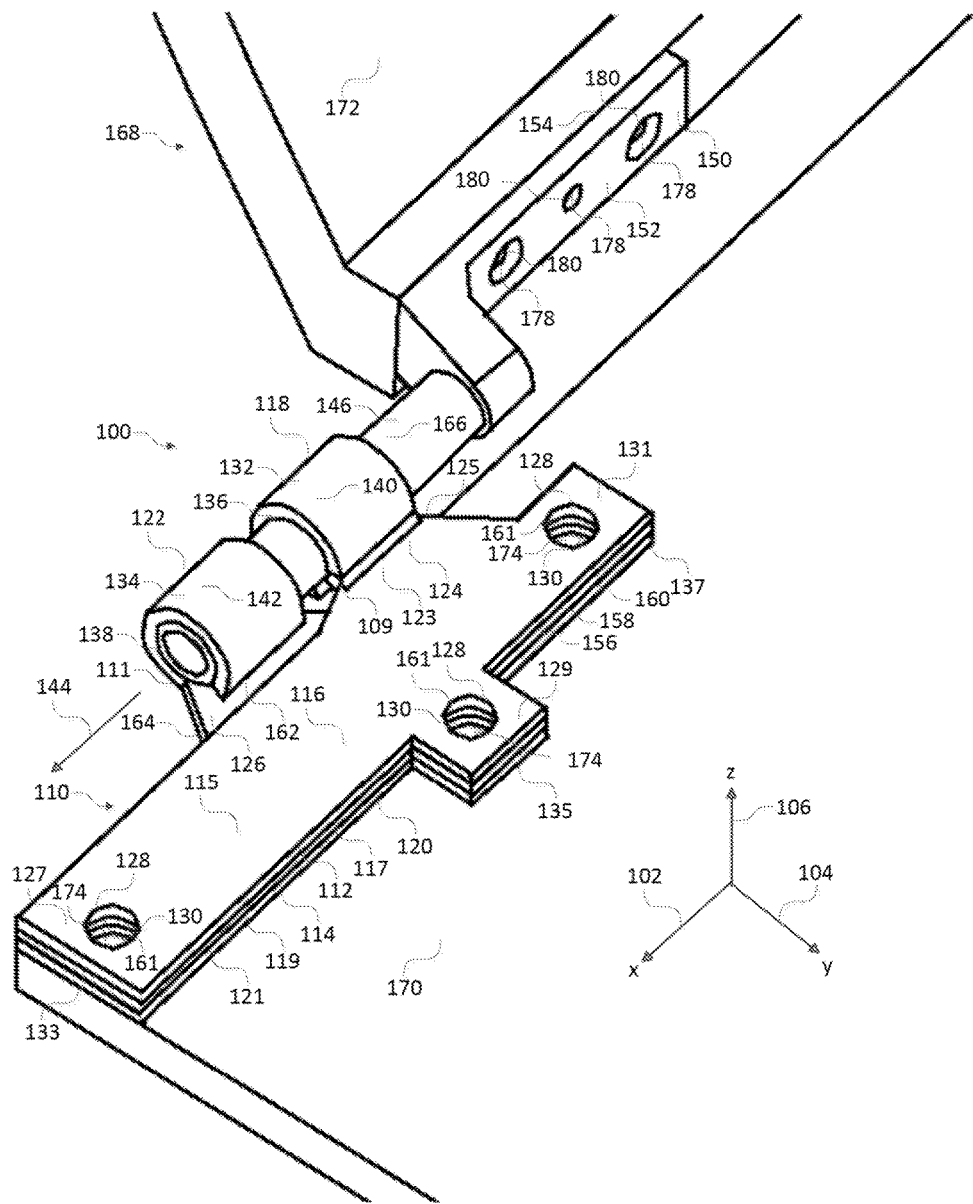
FIG. 2 illustrates a perspective view of a computing device having a friction hinge that has a hinge assembly, a pintle member, and a plate according to some examples.

FIG. 2 illustrates a perspective view of a computing device 168 having a friction hinge 100 that has a hinge assembly 110, a pintle member 146, and a plate 156 according to some examples. To aid in illustration of the friction hinge 100, a set of perpendicular axes are shown, namely an x-axis 102, y-axis 104, and z-axis 106.

The hinge assembly 110 may include hinge members 112 and 114. The hinge member 112 may include a mounting plate 115 having opposing mounting surfaces 116 and 117. The hinge member 112 may also include a gudgeon member 118. The hinge member 114 may include a mounting plate 119 having opposing mounting surfaces 120 and 121. The hinge member 114 may also include a gudgeon member 122. Because the hinge members 112 and 114 may be separate parts, the hinge members 112 and 114 may be mounted independently to a member such as a base section 170 of a computing device 168. The friction hinge 100 may also include a pintle member 146.

The friction hinge 100 may be used to rotatably attach two members to allow the two members to rotate with respect to each other about a pivotal axis of rotation 144 that is parallel or substantially parallel to the x-axis 102. The two members may be members of a computing device 168. For example, one member may be a display assembly 172 and the other member may be a base section 170. The computing device 168 may, for example, be a laptop, notebook computer, personal computer tablet, convertible notebook computer, or hand-held computer. If the hinge assembly 110 is attached, e.g. rigidly attached, to a display assembly 172 and the pintle member 146 is attached, e.g. rigidly attached, to a base section 170, then the display assembly 172 and the base section 170 may be allowed to rotate with respect to each other about the pivotal axis of rotation 144.

Each of the mounting surfaces 116, 117, 120, and 121 may be planar, such that the mounting surfaces 116, 117, 120, 121 may lie parallel or substantially parallel to a plane formed by the x-axis 102 and the y-axis 104, and perpendicular or substantially perpendicular to the z-axis 106. However, the mounting surfaces 116, 117, 120, and 121 do not necessarily need to be planar. Each of the mounting plates 115 and 119 may be substantially flat. For example, their thicknesses along the z-axis 106 may be substantially smaller than their widths in the x-axis 102 and y-axis 104. The mounting plate 115 may have extensions 127, 129, and 131, and the mounting plate 119 may have extensions 133, 135, and 137. Each of the extensions 127, 129, 131, 133, 135, and 137 may define one or more fastener receiving parts 128, and the mounting surfaces 120 and 121 may define one or more fastener receiving parts 130. In some examples, the fastener receiving parts 126 and 130 may be holes and/or grooves.

The mounting plate 115, and its mounting surfaces 116 and 117, may be attached to the gudgeon member 118, for example directly, or for example via a tongue portion 124 as shown in FIG. 2. Thus, the hinge member 112 may include a tongue portion 124 which may span between and be attached to each of the mounting plate 115 and the gudgeon member 118. Likewise, the mounting plate 119, and its mounting surfaces 120 and 121, may be attached to the gudgeon member 122, for example via a tongue portion 126. Thus, the hinge member 114 may include a tongue portion 126 which may span between and which may be attached to each of the mounting plate 119 and the gudgeon member 122.

The tongue portion 124 may have opposing tongue surfaces 123 and 125, and the tongue portion 126 may have opposing tongue surfaces 162 and 164. Each of the tongue surfaces 123, 125, 162, and 164 may be planar, such that the tongue surfaces 123, 125, 162, and 164 may be may lie parallel to or substantially parallel to a plane formed by the x-axis 102 and the y-axis 104, and perpendicular or substantially perpendicular to the z-axis 106. However, the tongue surfaces 123, 125, 162, and 164 do not necessarily need to be planar. If the mounting plates 115 and 119 are stacked in parallel along the z-axis 106, the total height of the region along the z-axis 106 having the tongue portions 124 and 126 may be increased and the tongue portions 124 and 126 may be spaced apart along the z-axis 106. As the tongue portions 124 and 126 may not be coplanar, and may instead be spaced apart along the z-axis 106, the tongue portions 124 and 126 may be widened along the x-axis 102 such that they may overlap each other along the z-axis 106. Each of these features may increase the rigidity the tongue portions 124 and 126 when the parts of friction hinge 100 are attached and in use, and may allow the tongue portions 124 and 126 to support a member such as a display assembly 172 with decreased bending of the tongue portions 124 and 126. In some examples, as shown in FIG. 2, the tongue portions 124 and 126 may have widths that taper along the y-axis 104 toward the gudgeon members 118 and 122 to form trapezoidal or substantially trapezoidal shapes until reaching sharp bends 109 and 111 that may transition into the gudgeon members 118 and 122, which may have constant widths along the x-axis 102. Thus, the tongue portions 124 and 126 may be wider along the x-axis 102 than the gudgeon members 118 and 122.

Each of the gudgeon members 118 and 122 may be annular, partially annular, or at least partially annular. The gudgeon members 118 and 122 may each have walls 132 and 134 having opposing cylindrical inner surfaces 136 and 138 and opposing cylindrical outer surfaces 140 and 142, such that the walls 132 and 134 may extend cylindrically and circumferentially and may wrap around and be aligned to the pivotal axis of rotation 144. In some examples, the walls 132 and 134 may extend substantially circumferentially 360 degrees to form closed annuluses. In other examples, such as is shown in FIG. 2, the gudgeon members 118 and 122 may curve and extend substantially circumferentially less than 360 degrees to form partially open annuluses. In these examples, the walls 132 and 134 may extend away from the respective mounting plates 115 and 119 in opposite substantially circumferential directions relative to each other.

The friction hinge 100 may include a plate 156. The plate 156 may have opposing surfaces 158 and 160, each of which may be planar, such that the surfaces 158 and 160 may be may lie parallel to or substantially parallel to a plane formed by the x-axis 102 and the y-axis 104, and perpendicular or substantially perpendicular to the z-axis 106. However, the surfaces 158 and 160 do not necessarily need to be planar. Each of the surfaces 158 and 160 may be substantially flat. For example, their thicknesses along the z-axis 106 may be substantially smaller than their widths in the x-axis 102 and y-axis 104. The mounting plate 115 may define one or more fastener receiving parts 161 which may be holes and/or grooves. The plate 156 may be disposed between the mounting plates 115 and 119. For example, the surface 158 may be attached to the mounting surface 116, and the surface 160 may be attached to the mounting surface 120. The plate 156 may have the same shape as the mounting plates 115 and 119, such that the edges of the mounting plates 115 and 119 and the plate 156 may be flush with each other around their perimeters. The plate 156 may be a stiffening plate and/or a damping plate. The plate 156 may stiffen the friction hinge 100 by, for example, increasing the width spanned along the z-axis 106 by the mounting plates 115 and 119 and the plate 156. For example, if the mounting plates 115 and 119 and the plate 156 are stacked in parallel along the z-axis 106, (1) the total height of the region along the z-axis 106 having the tongue portions 124 and 126 may be increased and the tongue portions 124 and 126 may be spaced apart along the z-axis 106, and (2) the total height of the region along the z-axis 106 having the mounting plates 115 and 119 and the plate 156 may be increased. The plate 156 may dampen vibrations on the friction hinge 100 by absorbing mechanical oscillations that may be produced by the friction hinge 100 during use. The stiffening and/or damping features may be due to the geometry of the plate 156 and/or the plate 156 being of a suitable material such as will be described below.

When the mounting plates 115 and 119, the plate 156, their surfaces 116, 117, 120, 121, 156, and 158, and the base section 170 are adjacent to each other, e.g. stacked in parallel along the z-axis 106 on a member such as the base section 170 of the computing device 168, each fastener receiving part 128 may be aligned with corresponding fastener receiving parts 130 and 161 and a corresponding fastener part 174 of the base section 170 to allow a fastener, e.g. a hinge pin or a screw, to be inserted through the corresponding fastener receiving parts 128, 130, 161, and 174. The fastener receiving parts 174 may be holes and/or grooves. Thus, each set of corresponding fastener receiving parts 128, 130, 161, and 174 may be aligned substantially along the z-axis 106 to allow a fastener to be inserted therethrough, such that the number of fasteners to be inserted may be equal to the number of sets of corresponding fastener receiving parts 128, 130, 161 and 174. If the one or more fasteners are inserted through the hinge members 110 and 112 and into the base section 170, the hinge members 110 and 112 may be attached, e.g. rigidly attached, to each other and to the base section 170.

The mounting plates 115 and 119, and their mounting surfaces 116, 117, 120, and 121, may be shaped so that the mounting plates 115 and 119 can be placed adjacent to each other, e.g. stacked in parallel along the z-axis 106 on a member such as a base section 170 of the computing device 168, such that the first and second gudgeon members 118 and 120 may be aligned to allow the pintle member 146 to be inserted therethrough, e.g. longitudinally inserted therethrough, and coupled to the gudgeon members 118 and 122, and such that the first and second tongue portions 124 and 126 may be spaced apart along the z-axis 106. In some examples, the pintle member 146 may be inserted through and/or rotatably coupled about the pivotal axis of rotation 144 to the gudgeon members 118 and 122. The pintle member 146 may frictionally engage the inner surfaces 136 and 138 by way of an interference fit wherein the inner surfaces 136 and 138 may exert an inward radial force on the pintle member 146, which may exert a reciprocal outward force on the inner surfaces 136 and 138. The frictional engagement of these cylindrical mating surfaces may allow the angular position between the hinge assembly 110, and thereby the base section 170, and the pintle member 146, and thereby the display assembly 172, to be maintained or held in place at any desired angle between the hinge assembly 110 and the pintle member 146, wherein the permitted range of angles may be between a minimum angle of zero degrees and a maximum angle of 180 degrees, for example. Thus, the base section 170 and the display assembly 172 may be oriented relative to each other between a minimum angle of zero degrees and a maximum angle of 180 degrees, for example.

The pintle member 146 may have a cylindrical or substantially cylindrical portion 166 and a mounting plate 150, and may extend substantially along the x-axis 102. The cylindrical or substantially cylindrical portion 166 may be a hollow annulus, or it may be a solid. The cylindrical or substantially cylindrical portion 166 may extend away from the gudgeon members 118 and 122 and may be attached at its other end to a mounting plate 150. The mounting plate 150 may extend longitudinally substantially parallel to the pintle member 146 along the x-axis 102. The mounting plate 150 may have opposing surfaces 152 and 154, each of which may be planar. However, the surfaces 152 and 154 do not necessarily need to be planar. The mounting plate 150 may rotate about the pivotal axis of rotation 144, and may include fastener receiving parts 178. The display assembly 172 may include fastener receiving parts 180. The fastener receiving parts 178 and 180 may be holes and/or grooves. A fastener, e.g. a hinge pin or a screw, may be allowed to be inserted through the corresponding fastener receiving parts 178 and 180 to attach the mounting plate 150 to the display assembly 172. The number of fasteners to be inserted may be equal to the number of sets of corresponding fastener receiving parts 178 and 180. If the one or more fasteners are inserted through the mounting plate 150 and into the display assembly 172, the pintle member 146 and the display assembly 172 may be attached, e.g. rigidly attached, to each other.

As shown in FIG. 2, the hinge members 112 and 114, pintle member 146, and plate 156 may be single integral pieces, for example one-piece constructions, such that there may be four separate integral pieces in the friction hinge 100. The hinge members 112 and 114, and the plate 156 may each be made of any suitable materials such as spring steel, and in particular, spring steel SK7. Each of the hinge members 112 and 114, and plate 156 may be made by stamping an integral thin sheet metal structure, followed by heating to harden the part. The pintle member 146 may be made of any suitable materials such as stainless steel. The stainless steel may be machined to make to pintle member 146.

In some examples, the plate 156 may be made of spring steel as described above, which may result in added stiffness to the friction hinge 100. In other examples, the plate 156 may be made of a hard polymer material having a high damping coefficient, such as a viscoelastic damping polymer, which may result in added stiffness and added damping characteristics. In some examples, the plate 156 may be made of both the spring steel and the hard polymer material.

The hinge assembly 110 and the plate 156 may have the following dimensions. Each of the mounting plates 115 and 119 and plate 156 may have widths of 42 millimeters along the x-axis 102, and may have widths of 1 millimeter along the z-axis 106. Each of the gudgeon members 118 and 122 may have widths of 6 millimeters along the x-axis 102, and may have outer diameters of 6 millimeters. The extension 127 may have a width along the y-axis 104 of 8 millimeters. The tongue portions 124 and 126 may have widths along the z-axis 106 of 1 millimeter and thus may have 1 millimeter of spacing between them along the z-axis 106. The tongue portions 124 and 126 may have widths that taper along the y-axis 104 toward the gudgeon members 118 and 122 from 11 millimeters to 6 millimeters to form trapezoidal or substantially trapezoidal shapes.

Although not shown in FIG. 2, an additional friction hinge may be included and spaced apart from the friction hinge 100 on the z-axis 106 at an opposite end of the computing device 168. The additional friction hinge may include the features of the friction hinge 100, except that the additional friction hinge may be a mirror image along the z-axis 106 of the friction hinge 100. Thus, the friction hinge 100 and the additional friction hinge may together be used to rotatably attach two members.

Figure 3:
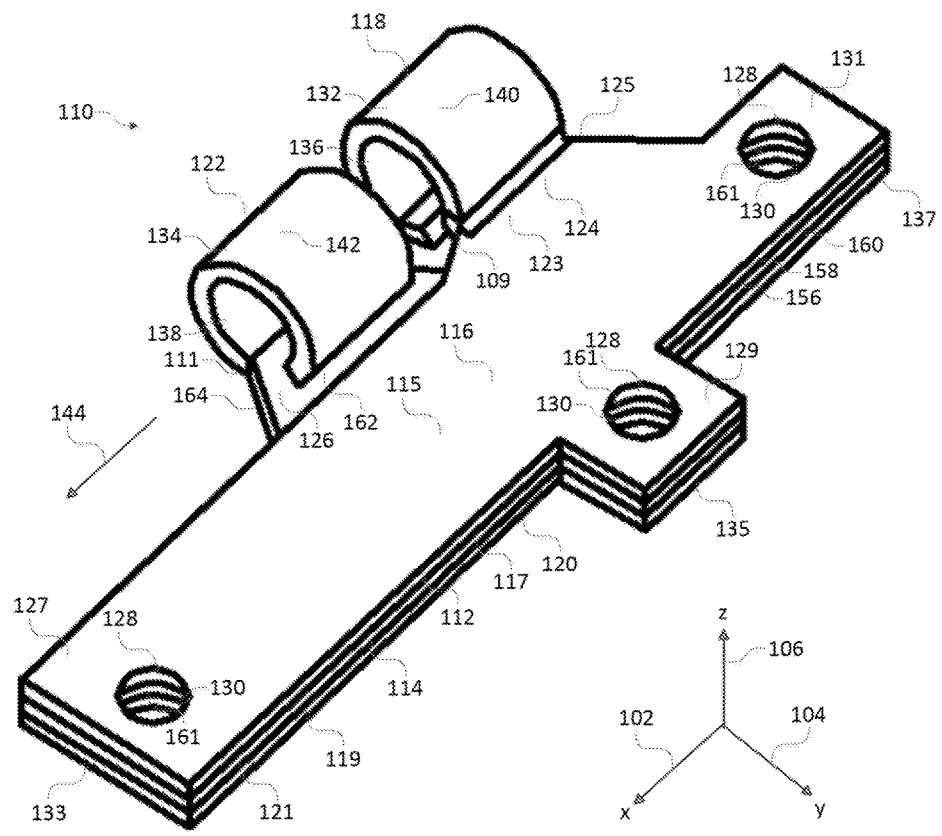
FIG. 3 illustrates a perspective view of the hinge assembly and the plate of FIG. 2 according to some examples.
Figure 4:
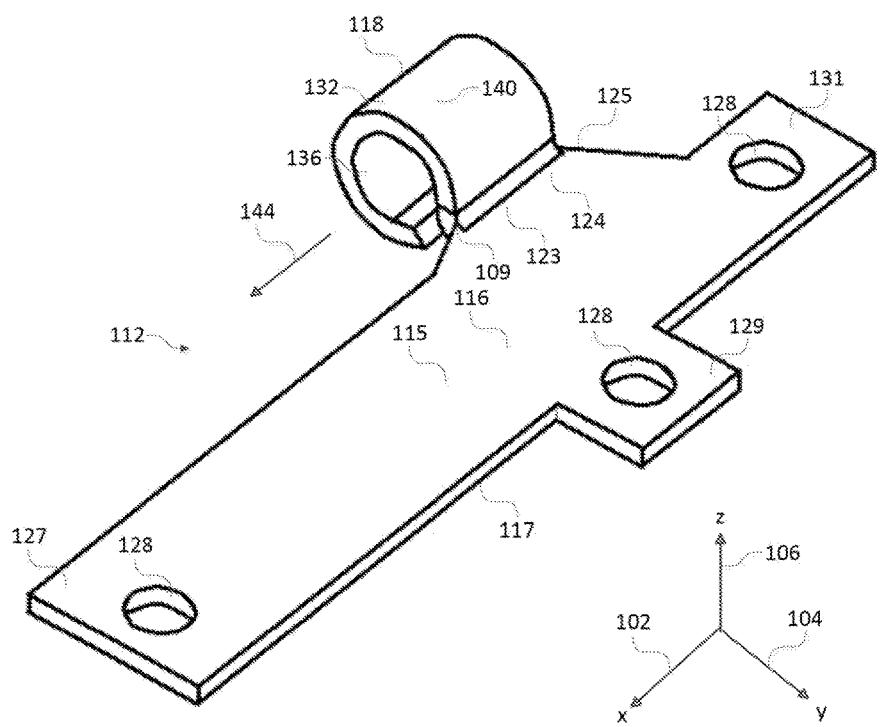
FIGS. 4 and 5 illustrate perspective views of hinge members of the hinge assembly of FIG. 2 according to some examples.
Figure 5:
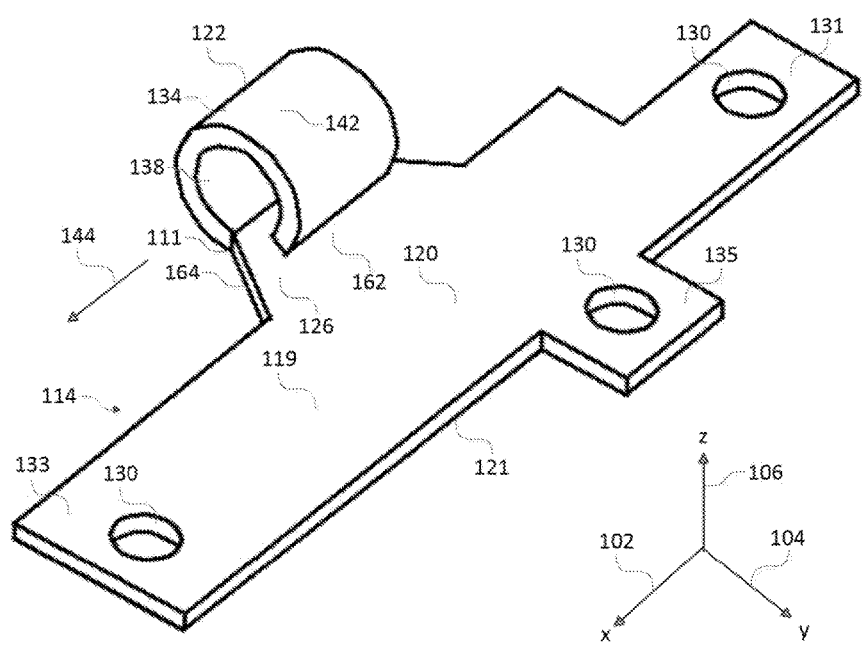

FIG. 3 illustrates a perspective view of the hinge assembly 110 and the plate 156 of FIG. 2 according to some examples, and FIGS. 4 and 5 illustrate perspective views of hinge members 112 and 114 of the hinge assembly 110 of FIG. 2 according to some examples. The computing device 168 and the pintle member 146 of FIG. 2 are not shown in FIGS. 3-5.

Figure 6:
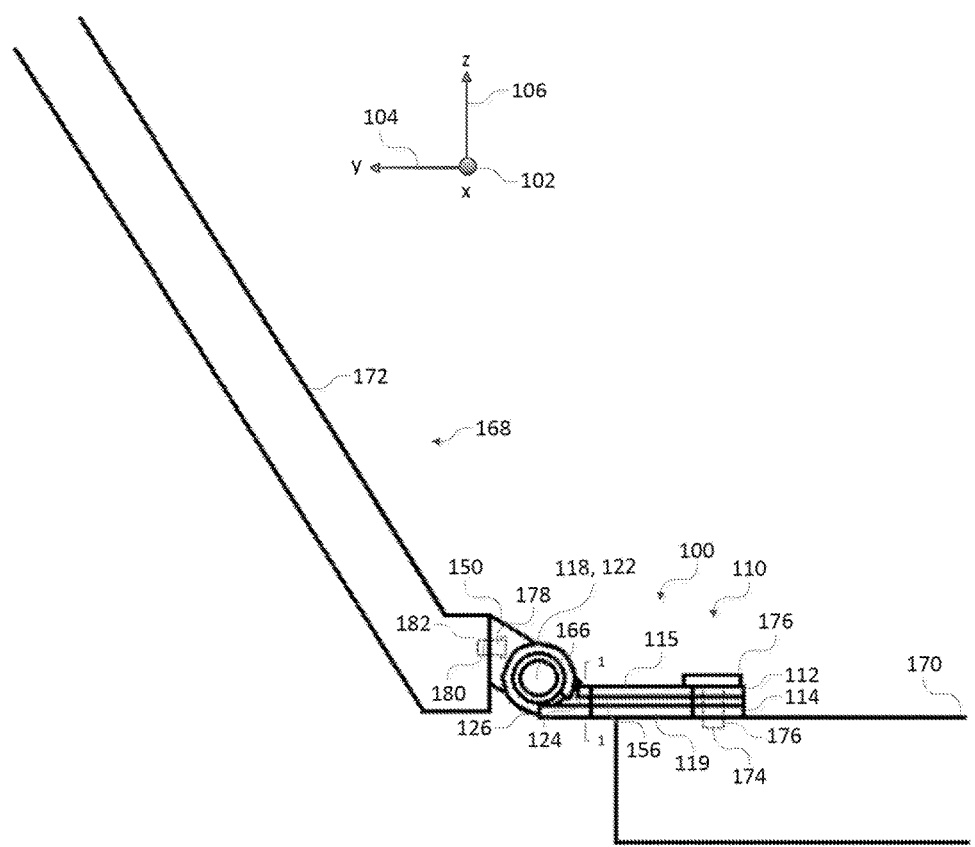
FIG. 6 illustrates a side view of the computing device of FIG. 2 according to some examples.

FIG. 6 illustrates a side view of the computing device 168 of FIG. 2 according to some examples. FIG. 6 additionally shows a fastener 176 e.g. a hinge pin or a screw, which may be inserted through the fastener receiving parts 128, 130, 161 and 174, and a fastener 182, e.g. a hinge pin or a screw, which may be inserted through the fastener receiving parts 178 and 180.

Figure 7:
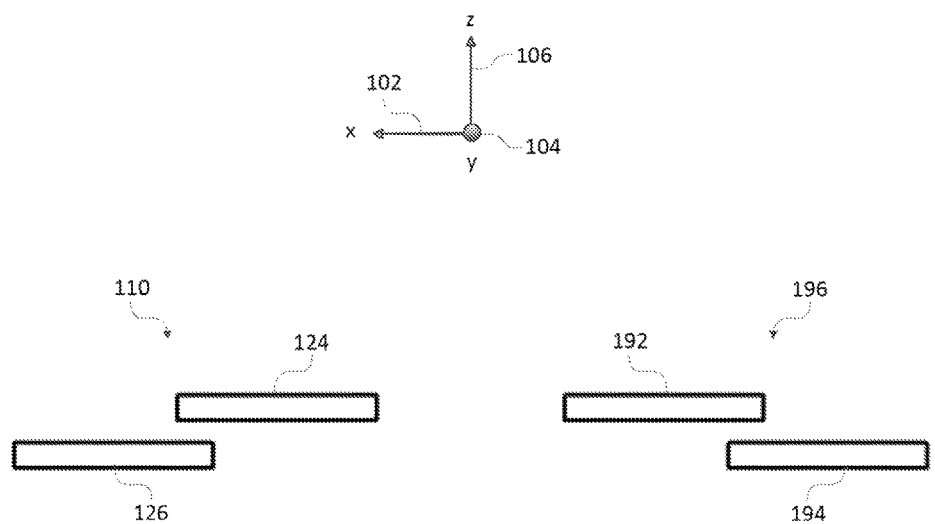
FIG. 7 illustrates a cross sectional view along line 1-1 of FIG. 6 of tongue portions of the hinge members of FIG. 6 and additional tongue portions of an additional hinge assembly according to some examples.

FIG. 7 illustrates a cross sectional view along line 1-1 of FIG. 6 of tongue portions 124 and 126 of the hinge members of FIG. 6 and additional tongue portions 192 and 194 of an additional hinge assembly 196 according to some examples. The tongue portions 124 and 126 may not be coplanar, and may instead be spaced apart along the z-axis 106. Thus, as shown, the tongue portions 124 and 126 may be widened along the x-axis 102, such that they overlap each other along the z-axis 106. Likewise, the tongue portions 192 and 194 may not be coplanar, and may instead be spaced apart along the z-axis 106. Thus, as shown, the tongue portions 192 and 194 may be widened along the x-axis 102 such that they overlap each other along the z-axis 106. The tongue portions 124, 126, 192, and 194 may be 120% wider than if they were not spaced apart on the z-axis 106. Additionally, the total height along the z-axis 106 of the tongue portions 124, 126, 192, and 194 may be 300% compared to if they were not spaced apart along the z-axis 106. The moment of inertia of the tongue portions 124, 126, 192, and 194 may thus be equal to 15.7 bh³/3, which may be 15.7 times greater than without the foregoing modifications to width and height, in which case the moment of inertia may have been bh³/3. The moment of inertia of 15.7 bh³/3 may provide high structural stability and stiffness.

Figure 8:
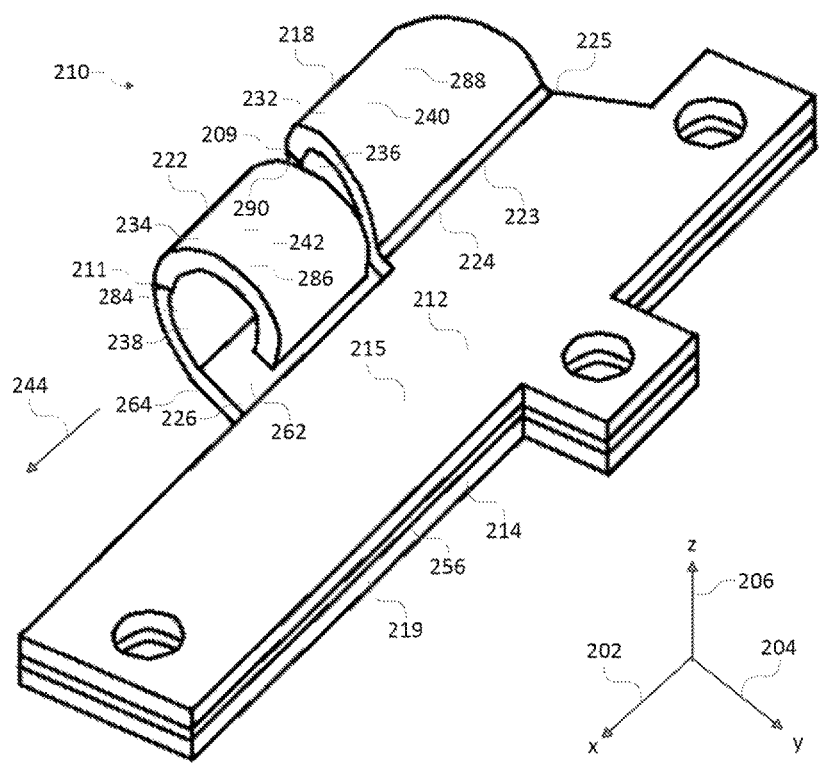
FIG. 8 illustrates a perspective view of a hinge assembly according to some examples.
Figure 9:
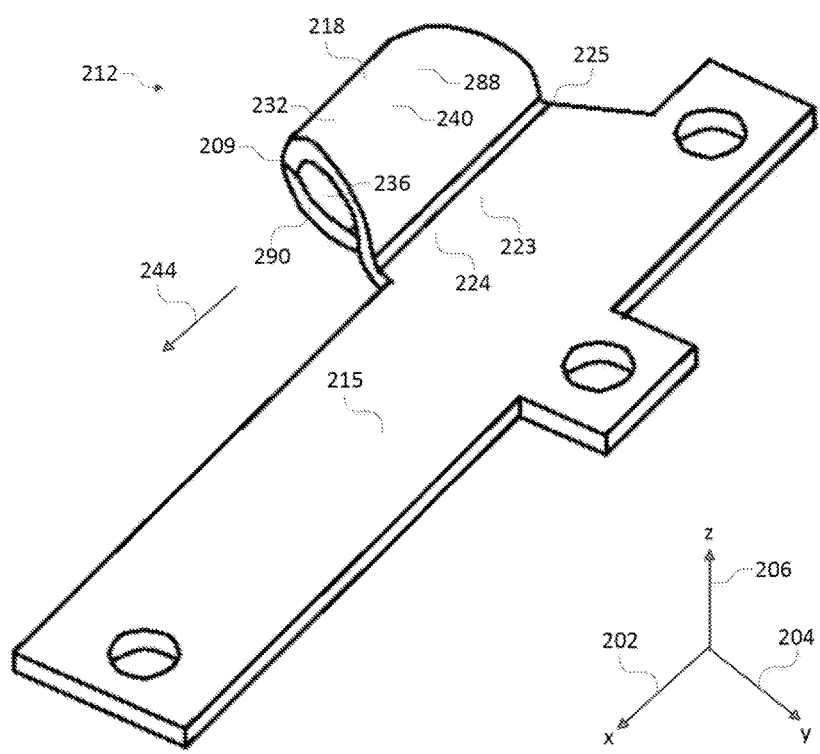
FIGS. 9 and 10 illustrate perspective views of hinge members of the hinge assembly of FIG. 8 according to some examples.
Figure 10:
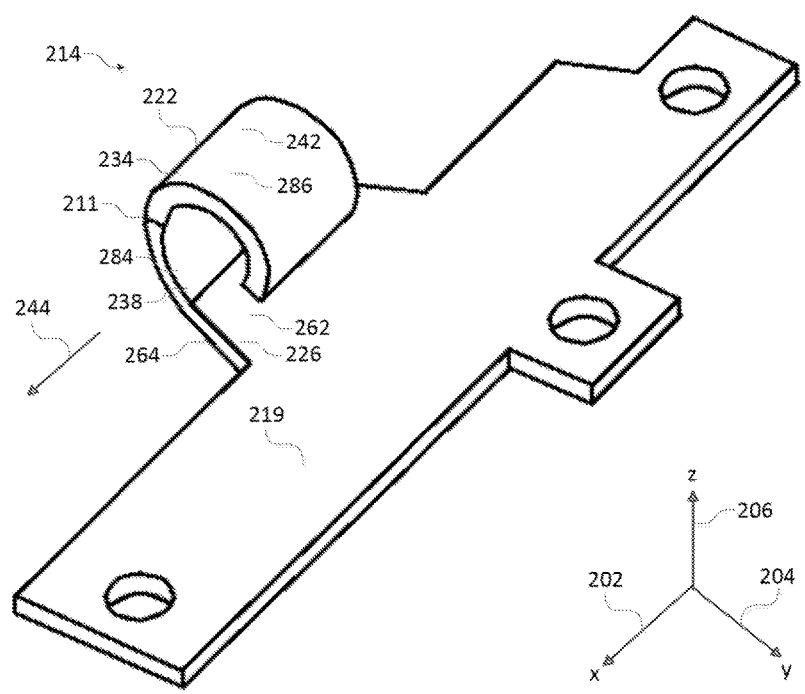

FIG. 8 illustrates a perspective view of a hinge assembly 210 and a plate 256 according to some examples, and FIGS. 9 and 10 illustrate perspective views of hinge members 212 and 214 of the hinge assembly 210 of FIG. 8 according to some examples. To aid in illustration of the hinge assembly 210 and the plate 256, a set of perpendicular axes are shown, namely an x-axis 202, y-axis 204, and z-axis 206.

The hinge assembly 210 and the plate 256 may be used with pintle member 146, base 170, and display assembly 172 of FIG. 2. The plate 256 may be identical to the plate 156 of FIG. 2. Moreover, the hinge assembly 210 may be identical to the hinge assembly 110 of FIG. 2, except that the hinge assembly 210 may include different tongue portions 224 and 226 in place of the tongue portions 124 and 126, and may include different gudgeon members 218 and 222 in place of the gudgeon members 118 and 122. Aside from any differences mentioned below, the tongue portions 224 and 226 may have the same features as the tongue portions 124 and 126, and the gudgeon members 218 and 222 may have the same features as the gudgeon members 118 and 122.

A mounting plate 215 may be attached to the gudgeon member 218 via the tongue portion 224. Thus, the hinge member 212 may include the tongue portion 224 which may span between and be attached to each of the mounting plate 215 and the gudgeon member 218. Likewise, a mounting plate 219 may be attached to the gudgeon member 222 via the tongue portion 226. Thus, the hinge member 214 may include the tongue portion 226 which may span between and which may be attached to each of the mounting plate 219 and the gudgeon member 222.

The tongue portion 224 may have tongue surfaces 223 and 225, and the tongue portion 226 may have tongue surfaces 262 and 264. Each of the tongue surfaces 223, 225, 262, and 264 may have a curved planar shape. The curved planes of the tongue portions 224 and 226 may have widths of 1 millimeter. The tongue portions 224 and 226 may not be coplanar, and may instead be spaced apart along the z-axis 206, for example they may have 1 millimeter of spacing between them along the z-axis 206. The tongue portions 224 and 226 may be widened along the x-axis 202 such that they may overlap each other along the z-axis 106. In some examples, as shown in FIGS. 8-10, the tongue portions 224 and 226 may have widths that taper along the y-axis 204 toward the gudgeon members 218 and 222 to form trapezoidal or substantially trapezoidal shapes. Thus, the tongue portions 224 and 226 may be wider along the x-axis 202 than the gudgeon members 218 and 222. Additionally, the tongue portions 224 and 226 may curve and extend circumferentially along the y-axis 204 rather than flat as is shown in FIG. 2, such that they may be curved trapezoids. The tongue portions 224 and 226 may curve and extend away from the respective mounting plates 215 and 219 in opposite substantially circumferential directions relative to each other while tapering.

Each of the gudgeon members 218 and 222 may be partially annular, and may each have walls 232 and 234 having cylindrical inner surfaces 236 and 238 and cylindrical outer surfaces 240 and 242, such that the walls 232 and 234 may extend cylindrically and circumferentially and may wrap around and be aligned to a pivotal axis of rotation 244. The gudgeon members 218 and 222 may extend substantially circumferentially to form partially open annuluses. The walls 232 and 234 may extend away from the respective mounting plates in opposite substantially circumferential directions relative to each other. Each of the gudgeon members 218 and 222 may have outer diameters of 6 millimeters. The wall 232 may include a tapering portion 284 and a non-tapering portion 286, and the wall 234 may include a tapering portion 288 and a non-tapering portion 290. The tapering portions 284 and 288 may respectively be attached to the tongue portions 224 and 226 and continue the taper that began at the tongue portions 224 and 226. The tapering portions 284 and 288 may continue to taper until reaching gradual bends 209 and 211 that may transition into the non-tapering portions 286 and 290. Thus at least one of or both of the gudgeon members 218 and 222 may taper in a direction away from the respective first and second mounting surfaces 215 and 219. The tongue portions 224 and 226 combined with the tapering portions 284 and 288 may have widths that taper toward the non-tapering portions 286 and 290 from 11 millimeters to 6 millimeters to form curved trapezoidal or substantially trapezoidal shapes. The non-tapering portions 286 and 290 may have constant widths of 6 millimeters along the x-axis 202. Each of the non-tapering portions 286 and 290 may extend substantially circumferentially for e.g., 180 degrees, about 180 degrees, or between about 170 degrees and about 190 degrees, such that they are partial annuluses, e.g. half-open annuluses. These features may further increase the rigidity the hinge members 212 and 214.

Thus, there have been described examples of hinge members, hinge assemblies, friction hinges, and computing devices. In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A hinge assembly of a computing device, the hinge assembly comprising:
   a first hinge member including a first mounting plate attached to a first gudgeon member via a first tongue portion;
   a second hinge member including a second mounting plate attached to a second gudgeon member via a second tongue portion;
   the first and second mounting plates being shaped so that the first and second mounting plates can be stacked in parallel along an axis such that the first and second gudgeons are aligned perpendicular to the axis to allow a pintle member to be inserted therethrough and such that the first and second tongue portions are spaced apart along the axis; and a stiffening plate attached between the first mounting plate and the second mounting plate to stiffen the hinge assembly.

2. The hinge assembly of claim 1 wherein the first gudgeon member includes a first wall and is at least partially annular to receive the pintle member, wherein the second gudgeon member includes a second wall and is at least partially annular to receive the pintle member, wherein the first and second walls extend away from respectively the first and second mounting plates in opposite substantially circumferential directions relative to each other.

3. The hinge assembly of claim 1 wherein the stiffening plate is to dampen oscillations in the hinge assembly.

4. The hinge assembly of claim 1 wherein the first and second tongue portions overlap each other along the axis.

5. The hinge assembly of claim 1 wherein the first tongue portion tapers toward the first gudgeon member, and wherein the second tongue portion tapers toward the second gudgeon member.

6. The hinge assembly of claim 1 wherein at least one of the first or the second tongue portions has a substantially trapezoidal shape.

7. The hinge assembly of claim 1 wherein the first hinge member is a first integral piece, and wherein the second hinge member is a second integral piece.

8. The hinge assembly of claim 7 wherein the first and second hinge members are made by stamping.

9. The hinge assembly of claim 1 wherein the first mounting plate defines a first fastener receiving part therein, wherein the second mounting plate defines a second fastener receiving part therein, and wherein when the first and second mounting plates stacked in parallel along the axis, the first and second fastener receiving parts are aligned to allow a fastener to be inserted therethrough.

10. The hinge assembly of claim 1, wherein the stiffening plate includes spring steel.

11. The hinge assembly of claim 1, wherein the stiffening plate includes a polymer.

12. The hinge assembly of claim 1, wherein the stiffening plate includes a viscoelastic damping polymer.

13. A hinge assembly of a computing device, the hinge assembly comprising:
a first hinge member including a first mounting plate attached to a first gudgeon member via a first tongue portion; and
a second hinge member including a second mounting plate attached to a second gudgeon member via a second tongue portion;
a plate attached between the first mounting plate and the second mounting plate to stiffen and dampen oscillations in the hinge assembly;
the first and second mounting plates being shaped so that the first and second mounting plates can be stacked in parallel along an axis such that the first and second gudgeons are aligned to allow a pintle member to be inserted therethrough and such that the first and second tongue portions are spaced apart along the axis;
the first and second tongue portions overlapping each other along the axis.

14. The hinge assembly of claim 13 wherein the first gudgeon member tapers in a direction away from the first mounting plate, and wherein the second gudgeon member tapers in a direction away from the second mounting plate.

15. The hinge assembly of claim 13 wherein the first tongue portion tapers toward the first gudgeon member, and wherein the second tongue portion tapers toward the second gudgeon member.

16. The hinge assembly of claim 13, wherein the stiffening plate includes spring steel.

17. The hinge assembly of claim 13, wherein the stiffening plate includes a polymer.

18. A computing device comprising:
a first part;
a second part; and
a friction hinge assembly including:
a pintle member attached to the first part;
a first hinge member including a first mounting plate attached to a first gudgeon member via a first tongue portion;
a second hinge member including a second mounting plate attached to a second gudgeon member via a second tongue portion; and
a stiffening plate attached between the first mounting plate and the second mounting plate to stiffen the hinge assembly;
the first and second gudgeon members being aligned and receiving the pintle member therethrough, the first and second mounting plates being stacked in parallel along an axis such that the first and second gudgeons are aligned and receive the pintle member therethrough and such that the first and second tongue portions are spaced apart along the axis.

19. The computing device of claim 18 wherein the first and second tongue portions overlap each other along the axis.

20. The computing device of claim 18, wherein the first part comprises a display assembly, and the second part comprises a base section, and the hinge assembly is to pivotally attach the display assembly to the base section.

* * * * *